United States Patent
Aubourg

(10) Patent No.: US 7,363,120 B2
(45) Date of Patent: Apr. 22, 2008

(54) METHOD OF ADJUSTING AT LEAST ONE DEFECTIVE ROTOR OF A ROTORCRAFT

(75) Inventor: Pierre-Antoine Aubourg, Marseille (FR)

(73) Assignee: Eurocopter, Marignane Cedex (FR)

( * ) Notice: Subject to any disclaimer, the term of this patent is extended or adjusted under 35 U.S.C. 154(b) by 361 days.

(21) Appl. No.: 11/149,300

(22) Filed: Jun. 10, 2005

(65) Prior Publication Data

US 2006/0058927 A1 Mar. 16, 2006

(30) Foreign Application Priority Data

Jun. 10, 2004 (FR) .................................. 04 06274

(51) Int. Cl.
*G06F 19/00* (2006.01)
(52) U.S. Cl. .............................. 701/3; 701/29; 702/35; 244/17.11
(58) Field of Classification Search ..................... 701/3, 701/4, 29; 244/17.11, 17.13, 17.19, 17.21, 244/17.23
See application file for complete search history.

(56) References Cited

U.S. PATENT DOCUMENTS

| | | | |
|---|---|---|---|
| 6,493,689 B2 * | 12/2002 | Kotoulas et al. | 706/23 |
| 6,751,602 B2 * | 6/2004 | Kotoulas et al. | 706/23 |
| 6,873,887 B2 * | 3/2005 | Zagranski et al. | 701/3 |
| 6,879,885 B2 * | 4/2005 | Driscoll et al. | 701/3 |
| 7,085,655 B2 * | 8/2006 | Ferrer | 702/35 |
| 7,177,710 B2 * | 2/2007 | Calise et al. | 700/28 |

FOREIGN PATENT DOCUMENTS

| | | |
|---|---|---|
| EP | 1310645 | 5/2003 |
| EP | 1310646 | 5/2003 |
| FR | 2824395 | 11/2002 |

* cited by examiner

*Primary Examiner*—Gary Chin
(74) *Attorney, Agent, or Firm*—Young & Thompson

(57) ABSTRACT

The present invention relates to a method of adjusting at least one defective, main or anti-torque rotor of a particular rotorcraft. The method uses a neural network representing the relationships between firstly accelerations representative of vibration generated on at least a portion of a reference rotorcraft, and secondly defects and adjustment parameters. After determining the defects, if any, of a defective rotor, an adjustment value $\alpha$ is defined for at least one of the adjustment parameters, advantageously by minimizing the following relationship:

$$\sum_c \lambda_c \sum_a \lambda_a \left( \sum_{h=1}^{B-2} (\lambda_h \| R_{c,a,h}(\alpha) + \gamma_{c,a,h} \|^2) + \lambda_{B-1} \left( \frac{\| R_{c,a,B-1}(\alpha) + \gamma_{c,a,B-1} \|^2}{\| \gamma_{c,a,B} \|} \right)^2 \right).$$

7 Claims, 2 Drawing Sheets

METHOD OF ADJUSTING AT LEAST ONE DEFECTIVE ROTOR OF A ROTORCRAFT

The present invention relates to a method of adjusting at least one defective rotor of a rotorcraft, e.g. a helicopter.

In the context of the present invention, the term "adjusting a defective rotor" is used to mean adjusting elements (e.g. blade pitch control rods, compensators weight, or tabs mounted on the blades of the rotor) for the purpose of reducing and minimizing vibration of at least a portion of a rotorcraft, e.g. the cockpit.

BACKGROUND OF THE INVENTION

Such vibration constitutes a major problem that needs to be combated insofar as such vibration leads to:
- alternating stresses throughout the rotorcraft leading to materials fatigue phenomena and thus having a direct influence on safety;
- vibration in the fuselage of the rotorcraft which can reduce the accuracy and the effectiveness of the equipments, in particular weapons mounted on the fuselage; and
- vibration in the cabin, which is naturally highly disturbing for pilot and passenger comfort.

Patent FR 2 824 395 in the name of the Applicant discloses a method of adjusting a rotor of a rotary wing aircraft. That method consists in using a reference neural network representing relationships between accelerations representative of vibration generated on at least a portion of a reference rotorcraft, and defects and adjustment parameters.

It is recalled that a neural network is conventionally made up of a set of elements operating in parallel and such that for given data inputs, the outputs of the set are characterized by the neural network. Such elements are based on biological nervous systems. As with biological neurons, the functions of a neural network are strongly determined by the connections between elements. It is thus possible to "train" a neural network so as to enable it to achieve some particular function by adjusting the values of the connections (values known as weights) between the elements. This "training" is performed or adjusted in such a manner as to ensure that each given input causes the network to deliver a specific output. On the topic of neural networks, reference can be made, for example, to an article entitled "Learning representation by back propagation errors" by D. Rumlhart, G. Hinton, and R. Williams, published in the journal Nature, 1996, Vol. 323, pp. 533 to 536.

When defects are identified on a particular rotorcraft rotor, the neural network having inlet and outlet cells is used to determine at least one adjustment parameter that is to be varied. The adjustment value α of an adjustment parameter that is to be varied is then obtained by minimizing the following expression:

$$\sum_c \lambda_c \sum_a \lambda_a \sum_h \lambda_h \|R_{c,a,h}(\alpha) + \gamma_{c,a,h}\|^2$$

in which:
- $\lambda_c$ is a weighting coefficient depending on the stage of flight c (hovering, cruising, . . . );
- $\lambda_a$ is a weighting coefficient depending on an accelerometer a;
- $\lambda_h$ is a weighting coefficient depending on the harmonic h;
- $R_{c,a,h}$ is the output cell from the neural network corresponding to the harmonic h, the accelerometer a, and the stage of flight c; and
- $\gamma_{c,a,h}$ is an acceleration signal at the frequency h as measured by the accelerometer a for the stage of flight c.

Nevertheless, that expression does not take account of the physiological perceptions of the occupants of the rotorcraft, i.e. the crew and the passengers. A virtual unbalance sensation remains in the cabin and this is particularly uncomfortable and even dangerous since pilot comfort is a safety's condition. This virtual unbalance is generated by a frequency beat effect caused by coupling between vibrations of harmonics B−1 and B of a rotorcraft rotor, where B is the number of blades of the rotor.

OBJECTS AND SUMMARY OF THE INVENTION

An object of the present invention is to propose a method enabling the above-described limitation to be overcome by introducing a factor, referred to for convenience in the text below as the "knock" factor, associating the level of vibration in the cabin with the physiological perception of its occupants.

Taking account of the physiological perception of the occupants when adjusting the main and anti-torque rotors of a rotorcraft is particularly innovative since a health criterion is being taken into consideration in addition to the measured vibration levels.

According to the invention, a method of adjusting at least one defective main or anti-torque rotor of a particular rotorcraft makes use of a neural network representative of relationships between firstly accelerations representative of vibration generated on at least a portion of a reference rotorcraft, and secondly defects and adjustment parameters. After determining possible defects of the defective rotor, an adjustment value α for at least one of the adjustment parameters is defined, advantageously by minimizing the following adjustment relationship:

$$\sum_c \lambda_c \sum_a \lambda_a \left( \sum_{h=1}^{B-2} \left( \lambda_h \|R_{c,a,h}(\alpha) + \gamma_{c,a,h}\|^2 \right) + \lambda_{B-1} \left( \frac{\|R_{c,a,B-1}(\alpha) + \gamma_{c,a,B-1}\|^2}{\|\gamma_{c,a,B}\|} \right)^2 \right)$$

in which:
- $\lambda_c$, $\lambda_a$, $\lambda_h$, and $\lambda_{B-1}$ are weighting coefficients depending respectively on the stage of flight c (hovering, cruising, . . . ), an accelerometer a, harmonics h, and the number of blades B of the rotor minus one;
- $R_{c,a,h}$ is an output cell of the neural network corresponding to the harmonic h, the accelerometer a, and the stage of flight c;
- $R_{c,a,B-1}$ is an output cell of the neural network corresponding to the harmonic B−1, the accelerometer a, and the stage of flight c;
- $\gamma_{c,a,h}$ is an acceleration signal at the frequency h measured by the accelerometer a for the stage of flight c;
- $\gamma_{c,a,B}$ is an acceleration signal at the frequency B measured by the accelerometer a for the stage of flight c;

$\gamma_{c,a,B-1}$ is an acceleration signal at the frequency (B−1) measured by the accelerometer a for the stage of configuration c.

The second term $$\frac{\|R_{c,a,B-1}(\alpha) + \gamma_{c,a,B-1}\|^2}{\|\gamma_{c,a,B}\|}$$

represents the knock factor. In this way, adjusting the defective rotor takes account of a physiological criterion that is not negligible for the occupants of the rotorcraft.

In addition, and advantageously, the neural network is obtained from at least one first series of measurements using a reference rotorcraft considered as a deformable body, having defect-free main and anti-torque rotors that are adjusted with a reference adjustment so that the vibration level of at least a portion of said reference rotorcraft is at a minimum.

In addition, the first series of measurements is performed, during particular operation of said reference rotorcraft, by measuring the values of at least one acceleration measured at arbitrary locations on said reference rotorcraft portion and representative of the vibration generated at said reference rotorcraft portion:

a) firstly with the defect-free main or anti-torque rotor of the reference rotorcraft while adjusted to said reference adjustment;

b) secondly by introducing defects into said defect-free main or anti-torque rotor; and c) then varying the adjustment values of a plurality of adjustment parameters of the rotor.

Preferably, the first series of measurements is taken during at least the following test flights:

a reference flight with the defect-free main or anti-torque rotor adjusted to said reference adjustment;

flights with main or anti-torque rotor defects;

a flight with a particular wrong adjustment of at least one balance weight of a blade;

a flight with a particular wrong adjustment of at least one blade rod; and a flight with a particular wrong adjustment of at least one compensator tab provided on the trailing edge of a blade.

In addition, at least one of the test flights includes the following stages, during which measurements are taken:

a stage of hovering flight;

a stage of cruising flight at about 50 meters per second (m/s);

a stage of flight at maximum continuous power; and a test on the ground with both the main and the anti-torque rotors turning.

According to the invention, in order to detect any defects of the defective rotor:

d) a second series of measurements is taken on a particular rotorcraft by measuring values for at least some accelerations at said particular rotorcraft portion during particular operation of said particular rotorcraft; and e) on the basis of said second series of acceleration measurements and on the basis of the neural network, possible defects are detected in said defective rotor.

Finally, adjustment elements define adjustment parameters comprising at least:

a balance weight for each of the blades of the defective rotor;

a rod on each of the blades of the defective rotor with the exception of a blade that represents a reference blade; and a compensator tab on the trailing edge of each of the blades of the defective rotor if such rotor is the main rotor.

BRIEF DESCRIPTION OF THE DRAWINGS

The invention and its advantages will appear in greater detail in the context of the following description of an embodiment given by way of illustration with reference to the accompanying figures, in which.

MORE DETAILED DESCRIPTION

Elements present in two or more distinct figures are given the same references in all of them.

Figure 1:
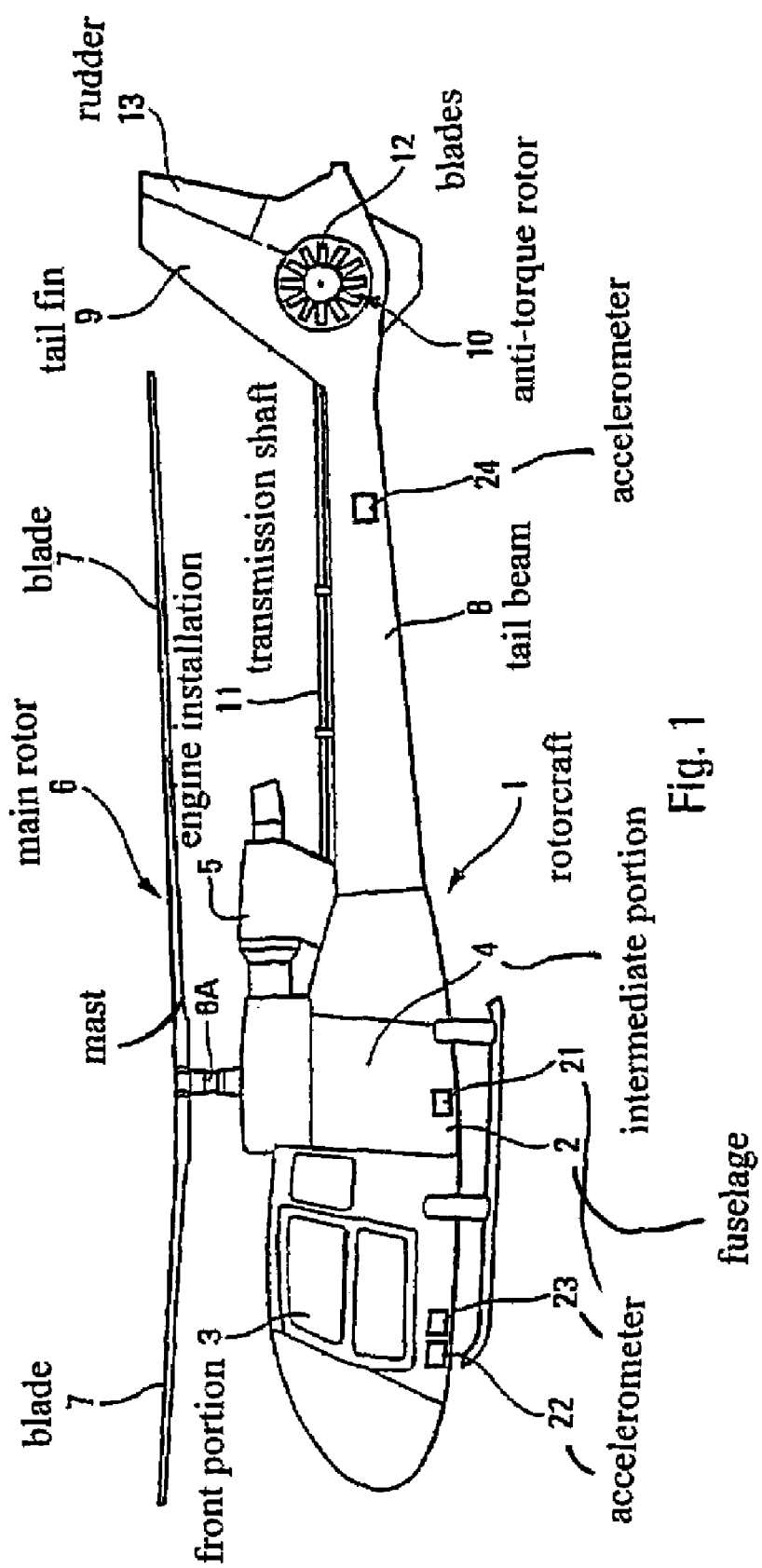
FIG. 1 shows a rotorcraft to which the method of the invention is applied.

FIG. 1 shows a rotorcraft 1, more precisely a helicopter, to which the method of the invention is applied. It comprises a fuselage 2 possessing a cockpit in its front portion 3. The intermediate portion 4 of the fuselage 2 has an engine installation 5 serving in particular to rotate a main rotor 6 for providing drive and lift and having a plurality of blades 7.

In addition, the fuselage 2 is extended rearwards by a tail beam 8, having a tail fin 9 carrying a rudder 13 mounted at the end thereof. In addition, the tail beam 8 includes an anti-torque rotor 10, e.g. at the base of the fin 9, the anti-torque rotor having blades 12 and being rotated by the engine installation 5 via a transmission shaft 11. Advantageously, the anti-torque rotor 10 is ducted, with the duct being constituted by the base of the fin 9.

In order to simplify the description, this rotorcraft may represent a reference rotorcraft having defect-free main and anti-torque rotors 6 and 10, or it may represent a particular rotorcraft for adjustment, having at least one of its main and anti-torque rotors 6 and 10 with a defect. Members common to both the reference rotorcraft and the particular rotorcraft are thus given the same references.

The present invention provides a method of adjusting at least one of the main and anti-torque rotors 6 and 10 when the rotor is defective in order to obtain a low level of vibration in the three directions of the rotorcraft 1 (axial, lateral, and vertical) in order to achieve optimum comfort and maximum operating safety.

This method makes use of a neural network built up during a training stage. It is representative of relationships between firstly accelerations representative of vibration generated on at least a portion of the reference rotorcraft (cockpit 3 and/or tail beam 8), and secondly defects and adjustment parameters. These relationships, converted into mathematical form by the neural network, are basic relationships for some given type of rotorcraft (Ecureuil, Dauphin, . . . ).

In addition, the neural network is obtained from at least a first series of measurements using a reference rotorcraft considered as being a deformable body, having its defect-free main and anti-torque rotors 6 and 10 adjusted to a reference adjustment for which the level of vibration in at least a portion of the reference rotorcraft (e.g. cockpit 3 or tail beam 8) is at a minimum.

In addition, the first series of measurements is taken during a particular operation of said reference rotorcraft by measuring the values of at least one acceleration. These measurements are representative of vibration generated in said portion of the reference rotorcraft and are taken at arbitrary locations in said portion of the reference rotorcraft:

a) firstly with the defect-free main or anti-torque rotor 6 or 10 of the reference rotorcraft adjusted in said reference adjustment;

b) secondly while introducing defects into said main or anti-torque rotor 6 or 10; and c) then by varying the adjustment values of a plurality of adjustment parameters of the main or anti-torque rotor 6 or 10.

The neural network is obtained by varying each of the adjustment parameters and each of the defects in turn, and by recording the vibration (acceleration) differences relative to the reference at a plurality of suitably selected locations in said portion of the rotorcraft. For each operating configuration and for each harmonic (obtained by the Fourier transform) this neural network gives the relationship between each measurement point, each adjustment parameter, and each defect.

The neural network (specific for each type of rotorcraft) is of the "feed-forward" type, being constituted by Nce input cells (Nce=Np adjustment parameters×Nd defects×B blades, where "×" represents multiplication), without bias, and possessing the identity function as its activation function. The output layer is made up of Ncs cells (Ncs=Na accelerometers×Nc flight stages×Nh harmonics for the real portion and for the imaginary portion of each weight) likewise having the identity function as its activation function, and still without bias.

Under such conditions, each defect that will need to be looked for subsequently is initially identified. Taking as an example the drag damper of a blade, the following operations are performed:

a damper, presenting the defect that is to be detected on a particular rotorcraft, is installed on the reference rotorcraft;

on the ground with the main and anti-torque rotors 6 and 10 rotating, and possibly also in flight if the state of the damper makes that possible, the vibration associated with the defect is recorded and the signature of the defect is established in terms of amplitude and phase suitable for distinguishing it from the defect-free reference signal. So, the neural network "leans" this defect and will be capable of identifying it subsequently.

Thus, in operation and on a particular rotorcraft, the signatures of defects will be recognized by the neural network on the basis of suitable criteria, taken from a preestablished list of defects, with recognition being performed as a function of the particular amplitudes or phase shifts of the signals coming from the detectors.

Advantageously, these detectors are conventional accelerometers 21, 22, 23, 24, so they measure accelerations. Preferably, in particular in order to adjust the main rotor 6, these accelerations comprise, in non-limiting manner, at least some of the following accelerations measured in the cockpit 3:

the longitudinal, lateral, and vertical accelerations at the floor of the cockpit 3, substantially vertically below the mast 6A of the main rotor 6, and capable of being measured by the accelerometer 21;

the vertical acceleration of the pilot's seat; and the vertical and lateral accelerations of the copilot's seat, measured by the accelerometers 22 and 23.

Similarly, to adjust the anti-torque rotor 10, acceleration of the tail beam 8 carrying the anti-torque rotor 10 is measured, e.g. via an accelerometer 24.

Furthermore, the method of the invention is remarkable in that during a development stage, it makes it possible to detect possible defects of a defective main or anti-torque rotor 6 or 10, and to determine an adjustment value for at least one of the adjustment parameters by implementing an adjustment relationship.

In order to detect possible defects of a defective main or anti-torque rotor 6 or 10:

d) a second series of measurements is taken on a particular rotorcraft, by measuring the values of at least certain accelerations in a portion 3, 8 of the particular rotorcraft during particular operation of said particular rotorcraft; and e) on the basis of this second series of acceleration measurements and on the basis of the neural network, possible defects of said defective main or anti-torque rotor 6 or 10 are detected.

In addition, the adjustment value α for at least one of the adjustment parameters is obtained by minimizing the following adjustment relationship:

$$\sum_c \lambda_c \sum_a \lambda_a \left( \sum_{h=1}^{B-2} (\lambda_h \|R_{c,a,h}(\alpha) + \gamma_{c,a,h}\|^2) + \lambda_{B-1} \left( \frac{\|R_{c,a,B-1}(\alpha) + \gamma_{c,a,B-1}\|^2}{\|\gamma_{c,a,B}\|} \right)^2 \right)$$

in which $\lambda_c$, $\lambda_a$, $\lambda_h$, and $\lambda_{B-1}$ are weighting coefficients depending respectively on the stage of flight c (hovering, cruising, . . . ), an accelerometer a, harmonics h, and the number of blades B of the rotor minus one;

$R_{c,a,h}$ is an output cell of the neural network corresponding to the harmonic h, the accelerometer a, and the stage of flight c;

$R_{c,a,B-1}$ is an output cell of the neural network corresponding to the harmonic B−1, the accelerometer a, and the stage of flight c;

$\gamma_{c,a,h}$ is an acceleration signal at the frequency h measured by the accelerometer a for the stage of flight c;

$\gamma_{c,a,B}$ is an acceleration signal at the frequency B measured by the accelerometer a for the stage of flight c;

$\gamma_{c,a,B-1}$ is an acceleration signal at the frequency (B−1) measured by the accelerometer a for the stage of flight c.

Figure 2:
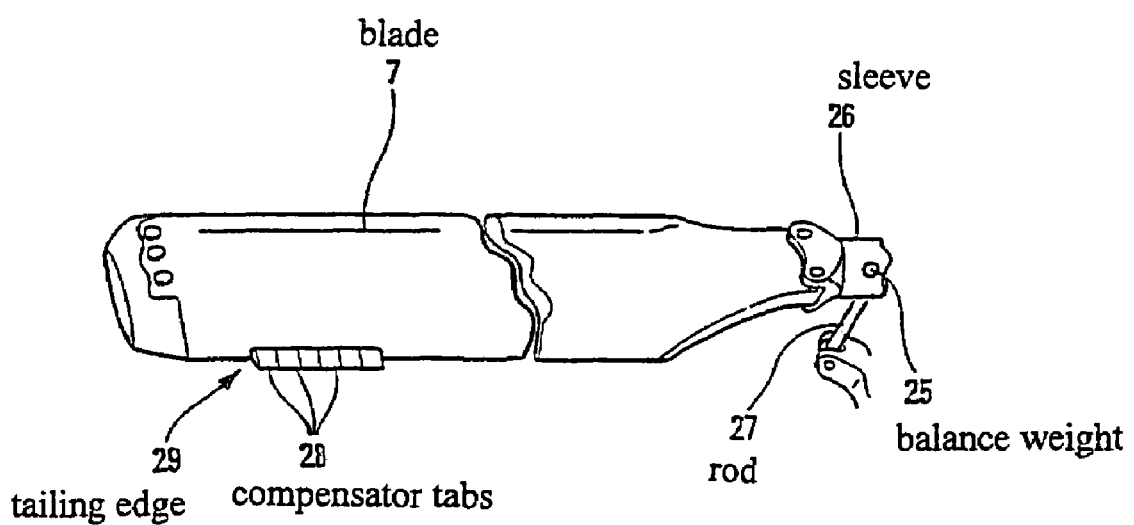
FIG. 2 shows a rotor blade provided with adjustment elements.

FIG. 2 shows a blade 7 of a main or anti-torque rotor 6 or 10 provided with adjustment elements.

In order to adjust the rotor 6, 10, the adjustment elements on which the above-defined parameters act are as follows:

balance weights 25 preferably provided at the sleeve 26 of the blade, for minimizing the unbalance of the defective rotor 6, 10 on which the blade is disposed;

compensator tabs 28 arranged on the trailing edge 29 of the blade 7 of the defective rotor if it is the main rotor 6, serving to compensate for differences in lift between two distinct blades of the same rotor; and a rod 27 that can be lengthened or shortened in order to increase or reduce the lift of the blade of the defective rotor 6, 10.

The influence of varying the length of the rod 27 on the lift of the blade of the defective rotor 6, 10 is a function of the relative position of the point where the rod 27 connects to the blade. For example, if the rod 27 is connected to the leading edge of the blade, increasing the length of the rod 27 increases the lift of said blade. Otherwise, if the rod 27 is connected to the trailing edge of the blade, increasing the length of the rod 27 reduces the lift of the blade.

In a variant of the invention, the first series of measurements is taken during at least the following test flight:
  a reference flight with the main and anti-torque rotors 6 and 10 adjusted in the reference adjustment for minimizing vibration level;
  flights with defects in the main and anti-torque rotors 6 and 10;
  a flight with a particular wrong adjustment of at least one balance weight 25 of a blade 7;
  a flight with a particular wrong adjustment of at least one rod 27 of a blade 7; and
  a flight with a particular wrong adjustment of at least one compensator tab 28 provided on the trailing edge 29 of a blade 7.

In addition, at least one of the test flights comprises the following stages, during which measurements are taken:
  a stage of hovering flight;
  a stage of cruising flight at about 50 m/s;
  a stage of flight at maximum continuous power; and
  a stage on the ground with the main and anti-torque rotors 6 and 10 turning.

Finally, in order to construct the neural network during the training stage, account is taken of the following hypotheses:
  the main and anti-torque rotors 6 and 10 are considered as being non-isotropic;
  the rotorcraft 1 is assumed to be a deformable body for the first two harmonics of the frequencies of vibration of the main rotor 6 and of the anti-torque rotor 10;
  the relationship between firstly the defects and the adjustment parameters, and secondly the acceleration values are non-linear; and
  the vibration level that exists at a particular point of the rotorcraft 1 is assumed to correspond to the sum of the individual vibrations generated at said particular point and caused by the defects and the wrong adjustments of said adjustment parameters.

Naturally, the present invention is capable of numerous variations as to its implementation. Although one particular implementation is described above, it will readily be understood that it is not conceivable to identify exhaustively all possible implementations.

What is claimed is:

1. A method of adjusting at least one defective main or anti-torque rotor (6, 10) of a particular rotorcraft, comprising the steps of:
  using a neural network that represents relationships between firstly accelerations representative of a vibration generated on at least a portion of a reference rotorcraft and secondly rotor defects and adjustment parameters, wherein each adjustment parameter is with respect to adjusting an element that affects the generated vibration;
  determining any defects of said rotor, wherein each one of said determined defects relates to a corresponding element that generated the vibration;
  determining an adjustment value α for at least one of said adjustment parameters by minimizing the following relationship:

$$\sum_c \lambda_c$$

$$\sum_a \lambda_a \left( \sum_{h=1}^{B-2} (\lambda_h \|R_{c,a,h}(\alpha) + \gamma_{c,a,h}\|^2) + \lambda_{B-1} \left( \frac{\|R_{c,a,B-1}(\alpha) + \gamma_{c,a,B-1}\|^2}{\|\gamma_{c,a,B}\|} \right)^2 \right)$$

in which:
  $\gamma_c$, $\gamma_a$, $\gamma_h$, and $\gamma_{B-1}$ are weighting coefficients depending respectively on the stage of flight c, an accelerometer a, harmonics h, and the number of blades B of the rotor minus one;
  $R_{c,a,h}$ is an output cell of the neural network corresponding to the harmonic h, the accelerometer a, and the stage of flight c;
  $R_{c,a,B-1}$ is an output cell of the neural network corresponding to the harmonic B−1, the accelerometer a, and the stage of flight c;
  $\gamma_{c,a,h}$ is an acceleration signal at the frequency h measured by the accelerometer a for the stage of flight c;
  $\gamma_{c,a,B}$ is an acceleration signal at the frequency B measured by the accelerometer a for the stage of flight c; and
  $\gamma_{c,a,B-1}$ is an acceleration signal at the frequency (B−1) measured by the accelerometer a for the stage of flight c; and
  based on the determined adjustment value, making an adjustment of at least one element to reduce the generated vibration.

2. A method according to claim 1, wherein said neural network is obtained from at least a first series of measurements using said reference rotorcraft (1) considered as being a deformable body, in which defect-free main and anti-torque rotors (6, 10) are adjusted to a reference adjustment at which the vibration level of at least said portion (3, 8) of said reference rotorcraft (1) is at a minimum.

3. A method according to claim 2, wherein said first series of measurements is taken during a particular operation of said reference rotorcraft by measuring the values of at least one acceleration, said measurements are taken at arbitrary locations on said portion (3, 8) of the reference rotorcraft and are representative of the vibration generated at said portion (3, 8) of the reference rotorcraft:
  a) firstly with the defect-free main or anti-torque rotor (6, 10) of the reference rotorcraft (1) adjusted to said reference adjustment;
  b) secondly by introducing defects in said defect-free main or anti-torque rotor (6, 10); and
  c) then by varying the adjustment values of a plurality of adjustment parameters of said main or anti-torque rotor (6, 10).

4. A method according to claim 3, wherein said first series of measurements is performed during at least the following test flights:
  a reference flight with the main or anti-torque rotor (6, 10) adjusted to said reference adjustment;
  flights with defects in said main or anti-torque rotor (6, 10);
  a flight with a particular wrong adjustment of at least one balance weight (25) of a blade (7);
  a flight with a particular wrong adjustment of at least one rod (27) of said blade (7); and a flight with a particular wrong adjustment of at least one compensator tab (28) provided on the trailing edge (29) of said blade (7).

5. A method according to claim 4, wherein at least one of said test flights includes the following stages, during which measurements are taken:
- a stage of hovering flight;
- a stage of cruising flight at about 50 m/s;
- a stage of flight at maximum continuous power; and
- a test on the ground with the main and the anti-torque rotors (6, 10) turning.

6. A method according to claim 3, wherein, in order to detect said defects of said rotor (6, 10), the following steps are performed:
- d) taking a second set of measurements on said particular rotorcraft (1) by measuring the values of at least some of said accelerations at said portion (3, 8) of the particular rotorcraft during particular operation of said particular rotorcraft; and
- e) detecting from said second series of measurements of accelerations and from the neural network, said defects of said rotor (6, 10).

7. A method according to claim 1, wherein adjustment elements defining said adjustment parameters comprise at least:
- a balance weight (25) for each of the blades (7) of the rotor (6, 10);
- a rod (27) on each of the blades (7) of the rotor (6, 10), with the exception of a blade that represents a reference blade; and
- a compensator tab (27) on the trailing edge (29) of each of the blades (7) of the rotor if it is the main rotor (6),
- each of the balance weight, the rod, and the compensator tab being adjustable to affect the generated vibration.

* * * * *